July 24, 1962 G. L. N. MEYER 3,046,027
VALVE SEALING ELEMENTS
Filed Feb. 11, 1960 2 Sheets-Sheet 1
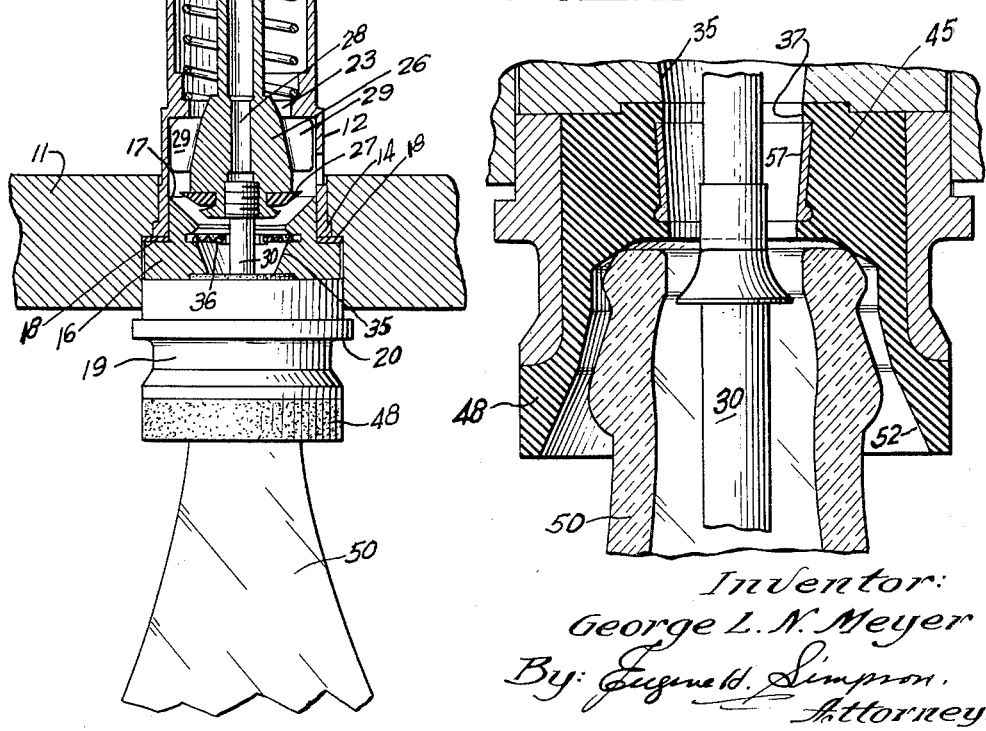
Inventor:
George L. N. Meyer
By: Eugene H. Simpson,
Attorney.

July 24, 1962

G. L. N. MEYER 3,046,027

VALVE SEALING ELEMENTS

Filed Feb. 11, 1960

Inventor:
George L. N. Meyer
By: Eugene H. Simpson,
Attorney

United States Patent Office 3,046,027
Patented July 24, 1962

3,046,027
VALVE SEALING ELEMENTS
George L. N. Meyer, Milwaukee, Wis., assignor to Geo. J. Meyer Manufacturing Co., Cudahy, Wis., a corporation of Wisconsin
Filed Feb. 11, 1960, Ser. No. 8,159
3 Claims. (Cl. 277—180)

This invention relates to a sealing ring for a filler valve and more particularly to a sealing ring which will enable a valve to fill a bottle more rapidly than is now possible.

Sealing rings have heretofore been made with metallic nipples through which the beer flows into the bottle. Such nipples, however, extended entirely through the sealing ring and if the bottle was slightly smaller in diameter than the standard bottle, the bottle had a tendency to strike the lower end of the nipple, thus crumpling it and reducing the diameter of the passage through the nipple.

It is an object of the present invention to provide a sealing ring having a nipple liner which will provide a greater opening through the valve into the bottle.

Another object is to provide a filler valve for bottle filling machines which will fill bottles more rapidly than those now in use.

A further object of the invention is to provide a sealing ring having a nipple therein which will not crumble or crush upon entrance of an undersized bottle to the valve.

A still further object is to provide a valve sealing element for a bottle filling machine which may be replaced without the necessity of dismantling the filler valve.

A still further object is to provide a valve sealing element for a bottle filling machine which may be replaced with a different sized nipple to vary the flow to the bottle without dismantling the filler valve.

Still further objects will become apparent upon considering the following specification which when taken in conjunction with the accompanying drawings illustrates a preferred form of the invention.

In the drawings:

FIG. 1 is an elevational view partly in cross-section showing a counter-pressure filler valve employing a sealing ring made according to the present invention;

FIG. 2 is a vertical cross-section through the center of the sealing ring per se;

FIG. 5 is an enlarged cross-section similar to FIG. 4 showing an undersized bottle in engagement with the sealing ring.

Figure 4:
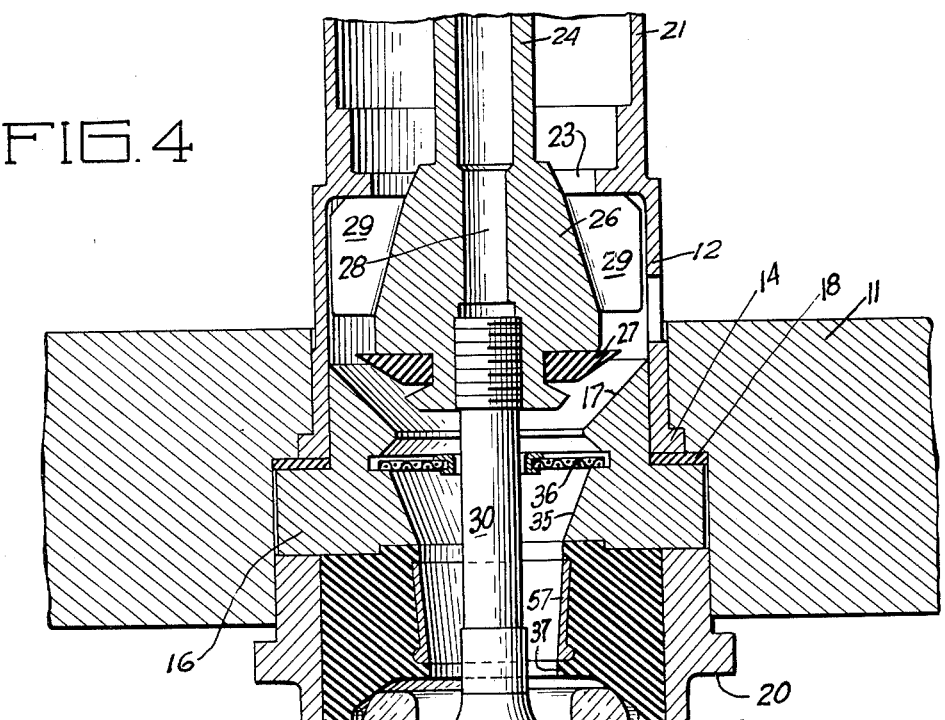
FIG. 4 is an enlarged vertical cross-section through a portion of the filler valve, and the upper part of a bottle in sealing engagement therewith.

Referring to the drawings and more particularly to FIG. 1, a plurality of filler valves 10 are mounted about a periphery of a circle in the bottom of a filler bowl 11. Since the valves 10 are identical only one has been shown and will be described.

The valve has a cylindrical cage 12 which projects through an opening in the bottom of the filler bowl 11, and is seated therein by an outstanding collar 14. A valve block 16 fits within the cage aperture from below and has a valve seat 17 extending into the interior of the cage 12.

An annular gasket 18 mounted between the bottom edge of the cage and the top of the valve block prevents leakage of either liquid or gas therepast. The valve block is pressed into tight engagement with the gasket 18 by a clamping ring 19. The clamping ring is kept in tight engagement by a forked lever (not shown) pressing upwardly against the shoulder 20 of the ring 19.

The valve cage has a spring housing 21 formed on the upper end thereof to retain a spring 22.

An opening 23 through the top of the cage provides for both entrance of beverage to the cage and for the passage of a hollow valve stem 24. The valve stem 24 is hollow to provide for the passage of gas from above the liquid level in the bowl to and from the container during the filling operation.

A valve element 26, having a rubber closure member 27, is carried on the lower end of the stem 24. The valve element 26 has a passageway 28 therethrough forming a continuation of the opening in the hollow valve stem 24. The valve element 28 has a plurality of wings 29 formed to center the element 26 in the cage 12 and seat the valve closure member 27 on the valve seat 17.

A vent stem 30 is secured in the lower side of the valve element 26. The vent stem 30 has an opening therein in alinement with the passages through the stem 24 and the valve element 26, which terminates adjacent the lower end of the vent stem. Openings 31 are cut in the sides of the vent stem to permit gas to pass into and out of the vent openings.

The spring 22 is a compression spring acting between the top of the cage and the lower side of a guide block 33. The guide block 33 is fixed in position on the valve stem by an O-ring 34 so that the spring 22 constantly urges the valve 26—27 into "valve open" position against the pressure of the liquid and gas in the filler bowl.

The valve block 18 is provided with an annular recess in the liquid passage 35, to receive a "foraminous element" 36 in the form of a screen disc. The element 36 is adapted to stop the flow of liquid through the surface tension of the liquid when the pressure in the bottle builds up to the pressure acting down on the top of the screen. The liquid passage 35 delivers liquid from the valve 26 into an opening 37 in a sealing ring 45 and into the bottle 50.

The flow of gas through the valve stem 24 and vent tube 30 is controlled by a gas valve 38 on the top of the stem 24. The valve 38 is constantly urged into open position by a spring 39 and is both opened and closed mechanically by a forked cam (not shown) which operates between the flanges 40—41 on a valve stem 42.

The clamping ring 19 (FIGS. 2, 3, 4, 5) contains the sealing ring 45, which is formed with a cylindrical periphery 46 (FIG. 2) which has a tight friction fit in the interior bore of the ring 19 with an outstanding skirt 48 formed around the lower edge of the ring and depending therebelow. The skirt 48 protects the upper edge or lip of the bottle 50, entering the valve, from striking the lower metal end of the clamping ring and being damaged thereby.

The bottle 50 enters a guide opening 52 which tapers slightly to properly guide the bottle into sealing engagement over the liquid passage 37.

The sealing surface 55 for the mouth of the bottle is concave downwardly to form a wide sealing surface throughout the periphery of the bottle mouth which will retain pressure within the bottle during filling.

Figure 3:
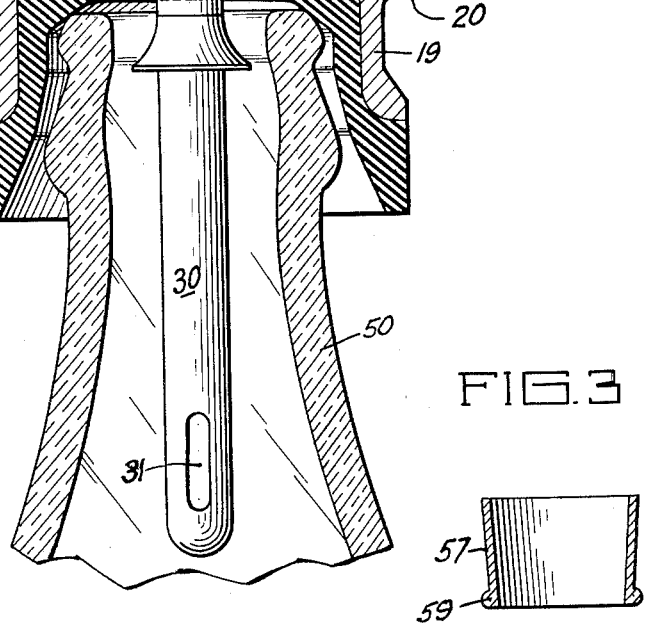
FIG. 3 is a vertical cross-section through the center of the nipple per se.

The opening 37 is reinforced by a nipple 57 (FIG. 3). The nipple 57, which has a slight downward taper to give a slight nozzle effect, fits in an annular recess 58 (FIG. 2) in the opening 37 with an annular bead-like lower end 59 on the nipple being seated in a corresponding bead recess 60 in the annular recess 58.

The nipple, which terminates above the sealing surface 55 and below the upper end of the sealing ring, provides reinforcement against pressure of the bottle on the sealing surface.

It will also be noted that the bottle 50 cannot contact the nipple to damage it, and that a slightly undersized bottle neck, while it may decrease the diameter of the fluid opening, slightly, as shown in FIG. 5, will likewise leave the nipple and the sealing ring undamaged.

For details of the operation of the valve elements, attention is directed to the patent of George L. N. Meyer 2,621,845, dated December 16, 1952.

The present construction of the sealing ring gives a sealing ring that is practically damage proof which accommodates bottles with either oversize or undersize necks and which provides a greater diameter opening through the sealing ring to assure faster filling than has heretofore been possible.

It will be realized that the herein described form of the invention is merely a preferred example thereof and that various changes in size, shape, and arrangement of parts may be resorted to without departing from the spirit of the invention or the scope of the subjoined claims.

That which is claimed as new and is desired to be secured by United States Letters Patent is:

1. In a device of the character described, a valve sealing element including a vertical cylindrical portion having a liquid passage axially positioned therethrough, said passage having a recess formed in its sides symmetrical to the vertical axis and extending vertically from a point spaced from the top to a point spaced from the bottom of the said cylindrical portion and a metallic nipple seated in the recess and forming a continuation of the liquid passage through the sealing element.

2. A device as recited in claim 1 including an annular bead recess in the sealing element and an annular bead on the lower end of the nipple receivable in the said bead recess.

3. A device as recited in claim 1 including an annular skirt formed on the bottom of the valve sealing element and depending therefrom to guide a container onto the sealing surface.

References Cited in the file of this patent

UNITED STATES PATENTS

| | | |
|---|---|---|
| 2,132,723 | Crickmer et al. | Oct. 11, 1938 |
| 2,746,781 | Jones | May 22, 1956 |
| 2,862,528 | Geisler | Dec. 2, 1958 |